United States Patent [19]
Herden

[11] Patent Number: 5,438,955
[45] Date of Patent: Aug. 8, 1995

[54] DRAINAGE GRATE FOR LIVESTOCK TRAILERS

[76] Inventor: Greg R. Herden, Rte. 1, Box 1133, Bridger, Mont. 59014

[21] Appl. No.: 155,202

[22] Filed: Nov. 22, 1993

[51] Int. Cl.⁶ .............................................. A01K 1/00
[52] U.S. Cl. ........................................ 119/28; 119/7
[58] Field of Search .................... 119/7, 9, 22, 28, 161

[56] References Cited

U.S. PATENT DOCUMENTS

| | | | |
|---|---|---|---|
| 366,699 | 7/1887 | Staunton | 119/22 |
| 2,144,329 | 1/1939 | Conlon et al. | 119/161 |
| 3,921,582 | 11/1975 | Sedlmeir | 119/161 |

Primary Examiner—Robert P. Swiatek
Attorney, Agent, or Firm—Risto A. Rinne, Jr.

[57] ABSTRACT

An apparatus for providing an enlarged drainage hole for the removal of animal bodily waste and other debris from the inside of livestock trailers including a grate assembly which slides into a grate housing that is adapted to receive the grate assembly. The grate assembly is inserted into the grate housing and is removed therefrom from outside of the trailer. The grate assembly, when inserted into the grate housing, cooperates with a drainage hole that is located inside of the livestock trailer to provide a smaller opening through the drainage hole than the drainage hole would otherwise provide when the grate assembly is removed from the grate housing. The smaller opening provided prevents any of the hooves and legs of livestock from passing through the drainage hole. When the grate assembly is removed a larger drainage hole is provided to aid in the removal of waste and debris from the inside of the livestock trailer. A latching mechanism is provided that is accessible only from the outside of the livestock trailer for retaining the grate assembly in a position of cooperation with the drainage hole and with the grate housing.

15 Claims, 2 Drawing Sheets

DRAINAGE GRATE FOR LIVESTOCK TRAILERS

BACKGROUND OF THE INVENTION

1. Field of the Invention

The present invention, in general, relates to livestock trailers and, more particularly, to cleaning grates that are used for the removal of animal waste from livestock trailers.

Livestock trailers are used to transport a great variety of livestock animals. As is the nature of the cargo transported, the animals frequently deposit both solid and liquid waste on the trailer floor.

Grates are provided for cleaning the inside of livestock trailers and are usually attached to the floor of the trailer. Usually, water under pressure is most commonly used to direct all of the debris inside of the livestock trailer towards the grate (or grates) that are provided.

However the solid waste (feces) occasionally obstruct the grates thereby causing an accumulation of water inside of the trailer to occur. The person cleaning the trailer is then required to manually remove the solid waste apart from the grates in order to allow the water to drain out of the trailer. This is an especially unpleasant task.

The grates are, for most types of livestock, attached to the floor so that the livestock cannot inadvertently remove the grates. If the grates were kicked or otherwise dislodged from their normal position while transporting cargo, the livestock could step into the grate openings and injure themselves. Therefore it is important to ensure that all drainage grates remain in the proper position during transportation of livestock.

Accordingly there exists today a need for an improved drainage grate for livestock trailers that provides for ample clearance during cleaning and which cannot be inadvertently dislodged from a normal position during the transportation of livestock.

2. Description of Prior Art

Drainage grates for livestock trailers are, in general, known. However improved drainage grates for use with livestock trailers having the structure as embodied by the disclosure herein are not previously known.

While the structural arrangements of the known types of prior devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an important object of the present invention to provide an improved drainage grate for livestock trailers that cannot be accidentally dislodged from a normal, closed position, by the activity of livestock in the trailer.

It is also an object of the invention to provide an improved drainage grate for livestock trailers that can be removed apart from a position of cooperation with the trailer floor to provide an enlarged opening for removal of debris from inside of the trailer.

Another object of the invention is to provide an improved drainage grate for livestock trailers that is adaptable to function with a variety of livestock trailers.

Still another object of the invention is to provide an improved drainage grate for livestock trailers that is inexpensive to manufacture.

Yet another object of the invention is to provide an improved drainage grate for livestock trailers that can be included as original factory equipment during the manufacture of livestock trailers.

Still yet another important object of the invention is to provide an improved drainage grate for livestock trailers that can be sold as an after-market accessory and be retrofitted to existing livestock trailers.

Briefly, an improved drainage grate for livestock trailers that is constructed in accordance with the principles of the present invention has a grate assembly, a portion of which protrudes out of the side of the trailer exterior and cooperates with a grate housing that is attached to the trailer in proximity to an opening that is provided through the floor. The grate assembly is slid into or is removed apart from the grate housing from a position of access that is located outside of the trailer. A latch is provided that is accessible from the trailer exterior and is used to maintain the grate assembly in a position of cooperation with the grate housing during the transportation of livestock. Accordingly, the latch cannot be released inadvertently by the livestock for it is inaccessible to livestock that are located inside of the trailer. However, when desired, an operator can easily access the latch from the outside of the trailer to allow for removal of the the grate assembly apart from the grate housing. Once the grate assembly is removed, a larger opening is thereby provided in the trailer floor to aid in removing debris from the inside of the trailer that is normally then either swept or flushed through the larger opening.

DETAILED DESCRIPTION OF THE INVENTION

Figure 1:
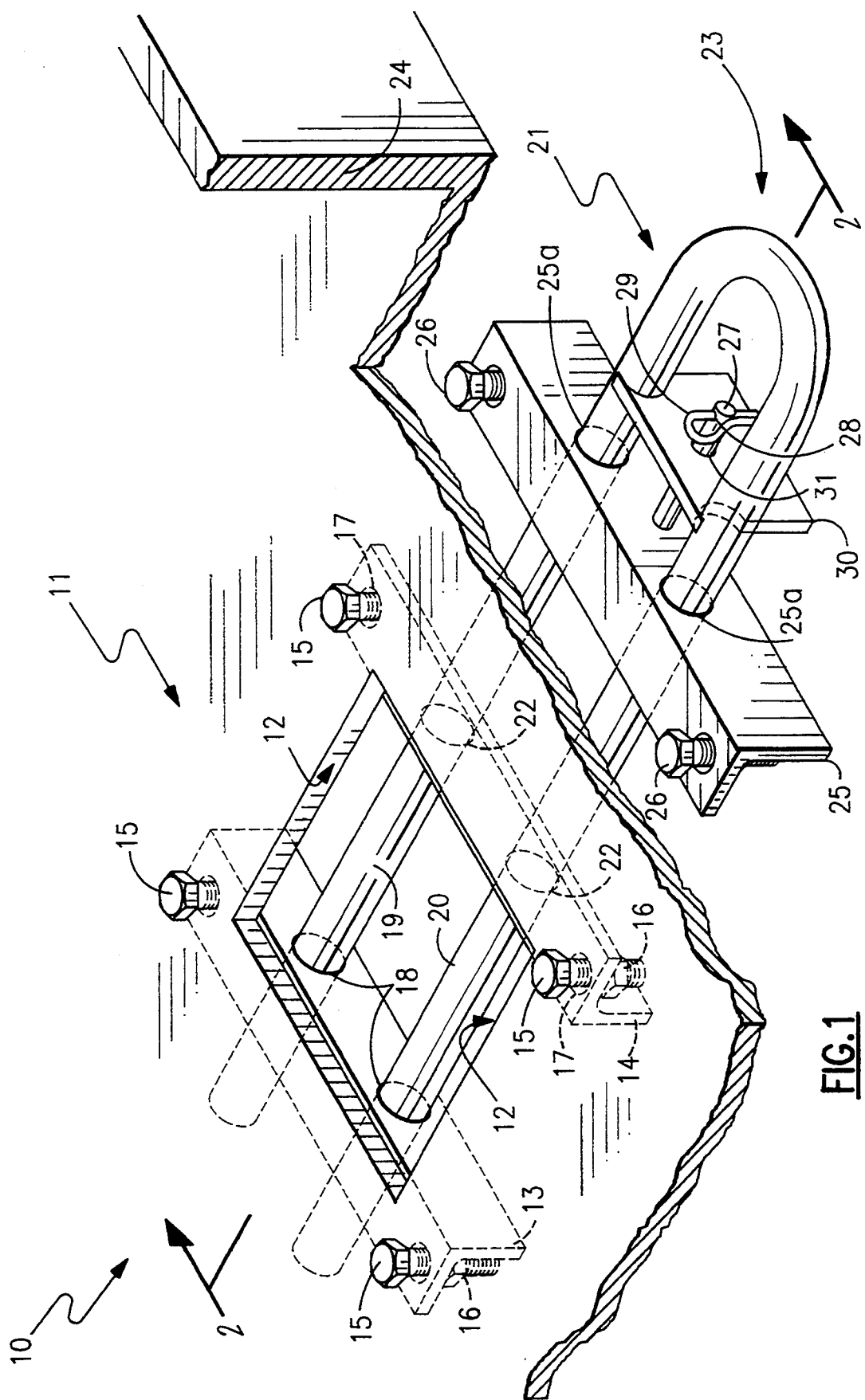
FIG. 1 is a view in perspective of an improved grate for livestock trailers.
Figure 2:
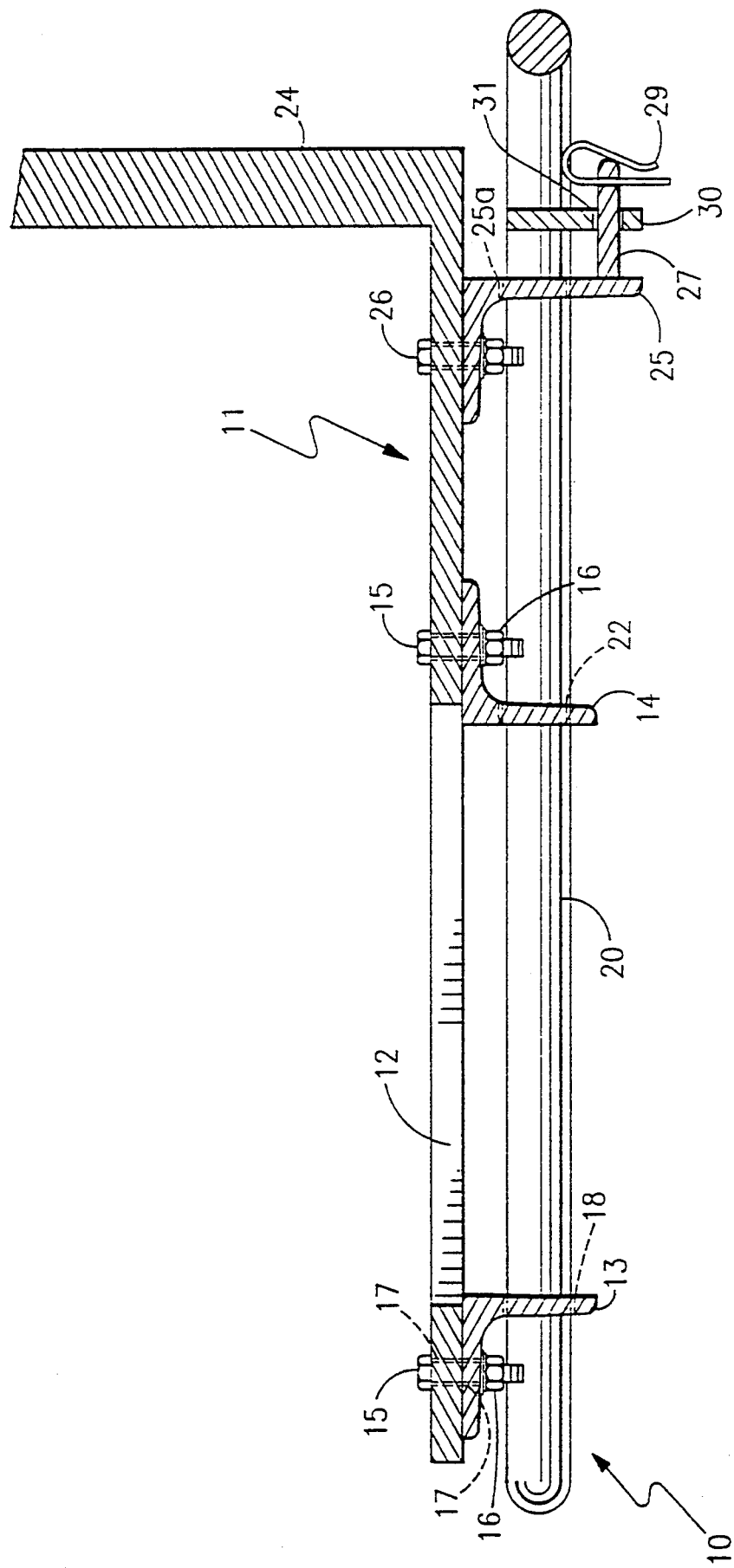
FIG. 2 is a view in cross section taken along the line 2—2 in FIG. 1.

Referring to FIG. 1 and to FIG. 2, is shown, an improved drainage grate for livestock trailers, identified in general by the reference numeral 10.

A floor, identified in general by the reference numeral 11 includes a generally rectangular shaped drainage hole 12 therein. A plurality of drainage holes 12 (only one is shown in the FIG. 1 drawing) are included in the floor 11 as desired. Each drainage hole 12 provides an opening through the floor 11 that exposes a section of the ground (not shown) that is generally located underneath a livestock trailer (not shown).

A first supporting member 13 is attached to the floor 11 in proximity to the drainage hole 12. A second supporting member 14 is attached to the floor parallel with respect to the first supporting member 13 and is disposed a predetermined distance therefrom.

Although many types of material stock are possible selection choices to accommodate the various types of livestock trailers, the preferred material for use is generally an angle type of stock, such as angle iron, for construction of the first and second supporting members 13, 14. Of course, aluminum and other types of materials are suitable for use as well.

The first and second supporting members 13, 14 are disposed immediately underneath the floor 11 and are attached thereto by a plurality of bolts 15 and a plurality of nuts 16 which pass through a plurality of bolt holes 17 that are provided through the first and second supporting members 13, 14 and through the floor 11 (not shown) as well.

The nuts 16 are attached directly to the first and second supporting members 13, 14 or are included as separate component parts. If preferred, the bolt holes of the first and second supporting members 13, 14 include bolt threads (not shown) that are machined therein and which cooperate with the threaded portion of the bolts 15 thereby eliminating completely the need for the nuts 16.

The first supporting member 13 includes a pair of first grate holes 18 that are separated a predetermined distance apart and are sized to allow passage of a portion of a first rod 19 and a portion of a second rod 20 therein.

The first and second rods 19, 20 are component parts of a grate assembly, identified in general by the numeral 21, that is described in greater detail hereinbelow.

The second supporting member 14 includes a pair of second grate holes 22 that align with the pair of first grate holes 18 and are also sized to allow passage of a portion of a first rod 19 and a portion of a second rod 20 therein.

The first rod 19 has a predetermined length and diameter that is disposed parallel to and at a predetermined distance apart from the second rod 20. The first and second rods 19, 20 are typically constructed of the same size and type of material stock.

Round stock is used for the construction of the first and second rods 19, 20 as shown and accordingly the pair of first grate holes 18 and the pair of second grate holes 22 are of a size and shape adapted to allow passage of the first and second rods 19, 20 therein. If preferred modified first and second rods (not shown) that are formed of square or any desired cross sectional shape material are used, and modified first and second pairs of grate holes (not shown) are provided which are adapted in size and shape to receive the modified first and second rods.

The first and second rods 19, 20 are open at one end and are attached together at the remaining ends thereof by any method that is desired. For example a connecting bracket (not shown) may be attached to the remaining ends of the first and second rods 19, 20 thereby maintaining them in a predetermined parallel spaced apart relationship with respect to each other.

A preferred type of construction that is useful to maintain the first and second rods 19, 20 in a predetermined parallel spaced apart relationship with respect to each other is shown in FIG. 1 wherein the first and second rods 19, 20 are formed by bending a longer rod (not shown) in the center to form, in general, a U-shaped portion at the center, identified in general by the reference numeral 23.

The first and second rods 19, 20, when inserted through both the pair of first grate holes 18 and through the pair of second grate holes 22, provide a bearing surface in the general area as provided by the drainage hole 12 that is suitable for livestock to stand upon. Depending upon the size of the drainage hole 12 and the type of livestock to be transported, the distance between the first and second rods 19, 20 is accordingly determined.

For example when transporting small hooved animals either a smaller drainage hole (not shown) is required or the grate assembly 21 is constructed so as to include more than two of the first and second rods 19, 20. A greater quantity of parallel rods (not shown) will result in a lesser distance separating each of the parallel rods. The object is to ensure that the distance between the parallel rods is sufficient to prevent any livestock animal from lodging a foot (not shown) in the space between each of the parallel rods.

Conversely when transporting especially large types of livestock animals, either a larger drainage hole (not shown) is provided, or if desired, as few as one rod (not shown) is provided for insertion through one of the pair of first grate holes 18 and through one of the pair of second grate holes 22.

Located under the floor 11 and near to an exterior wall 24 of the livestock trailer a mounting bracket 25 is provided that is attached to the floor 11 by bracket bolts 26. The mounting bracket 25 is useful for securing the grate assembly 21 in position and is described in greater detail hereinbelow.

A protrusion 27 is attached to the mounting bracket 25 and extends generally parallel with either of the first and second rods 19, 20 away from the interior of the livestock trailer. An end hole 28 is provided at the end of the protrusion 27 that is located furthest away from the mounting bracket 25 and is adapted to receive a retainer pin 29.

The mounting bracket 25 includes a pair of mounting bracket holes 25a that align with the pair of first grate holes 18 and with the pair of second grate holes 22 and are also sized to allow passage of a portion of the first rod 19 and a portion of the second rod 20 to pass through.

The grate assembly 21 includes a cross bracket 30 that is perpendicular with respect to the longitudinal axis of the first and second rods 19, 20 and is disposed between the first rod 19 and the second rod 20.

The cross bracket 30 includes a bracket hole 31 having a predetermined size and shape that is disposed at a predetermined location on the cross bracket 30 so that the protrusion 27 will pass through the bracket hole 31 when the first and second rods 19, 20 of the grate assembly 21 are fully inserted through the pair of first grate holes 18, the pair of second grate holes 22, and the pair of mounting bracket holes 25a.

The mounting bracket 25, first supporting member 13, and second supporting member 14 together form a grate housing (not identified by a reference numeral) that is adapted to receive, support, and to retain the grate assembly 21.

The retainer pin 29 is inserted through the end hole 28 when it is desired to maintain the grate assembly 21 in position and is extracted from the end hole 28 when it is desired to remove the grate assembly 21. The grate assembly 21 is typically removed when it is necessary to clean the interior of the livestock trailer.

When the grate assembly 21 is removed, the first and second rods 19, 29 are withdrawn from a position of cooperation in proximity to the drainage hole 12. The drainage hole 12 is then unobstructed and animal waste (not shown) as well as other debris (not shown) is easily either swept (by a broom) or flushed (with running water from a hose) through the unobstructed drainage hole 12 and out of the trailer. Accordingly the effective size of the drainage hole 12 is increased when the grate assembly 21 is removed apart from the grate housing.

Prior to loading livestock back into the livestock trailer, the first and second rods 19, 20 of the grate assembly 21 are fully inserted through the pair of mounting bracket holes 25a, the pair of second grate holes 22, and the pair of first grate holes 18. The retainer pin 29 is then inserted through the end hole 28 to maintain the grate assembly 21 in position. The livestock are then loaded into the trailer.

As the retainer pin 29 is not accessible to any of the livestock that are located inside of the livestock trailer, they cannot inadvertently dislodge the retainer pin 29 or otherwise cause the first and second rods 19, 20 of the grate assembly 21 to be removed from their position of cooperation with respect to the drainage hole 12.

While the use of the protrusion 27, the end hole 28, and the retainer pin 29 of the grate housing in cooperation with the cross bracket 30 and the bracket hole 31 of the grate assembly 21 provide an effective type of a latch assembly (not identified by a reference numeral) that is useful to maintain the grate assembly 21 in a predetermined position, other types of latches (not shown) as are generally known are also useful to secure the grate assembly 21 in position and shall now become obvious to those skilled in the art after having had the benefit of this disclosure.

The invention has been shown, described and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. An improved drainage grate adapted for use with a livestock trailer, comprising:
   (a) grate housing means adapted to be disposed substantially under a drainage hole that is provided through a portion of the floor of said livestock trailer,
   (b) grate assembly means adapted for slidable insertion into said grate housing means from a position that is located outside of said livestock trailer and for slidable removal from said grate housing means, and
   (c) latching means that is located outside of said livestock trailer for maintaining said grate assembly means in a position of cooperation with said grate housing means.

2. The improved drainage grate for livestock trailers as defined by claim 1 wherein said grate housing means includes supporting bracket means adapted for receiving said grate assembly means.

3. The improved drainage grate for livestock trailers as defined by claim 1 wherein said grate housing means includes a first portion of said latching means.

4. The improved drainage grate for livestock trailers as defined by claim 3 wherein said first portion of said latching means includes mounting bracket means.

5. The improved drainage grate for livestock trailers as defined by claim 4 wherein said mounting bracket means includes at least one protrusion adapted for cooperating with said grate assembly means.

6. The improved drainage grate for livestock trailers as defined by claim 5 wherein said grate assembly means includes a second portion of said latching means adapted for cooperating with said first portion of said latching means.

7. The improved drainage grate for livestock trailers as defined by claim 6 including retaining pin means adapted for inserting through a hole provided in said at least one protrusion for maintaining said first portion of said latching means in a position of cooperation with said second portion of said latching means.

8. The improved drainage grate for livestock trailers as defined by claim 1 wherein said grate assembly means includes rod means adapted for inserting into said grate housing means, said rod means providing a bearing surface over a portion of said drainage hole for livestock to stand upon.

9. The improved drainage grate for livestock trailers as defined by claim 8 wherein said rod means includes a plurality of rod means.

10. An improved drainage grate adapted for use with a livestock trailer, comprising:
    (a) grate housing means adapted to be disposed substantially under a drainage hole that is provided through a portion of the floor of said livestock trailer, said grate housing means including supporting bracket means,
    (b) grate assembly means adapted for slidable insertion into said supporting bracket means from a position that is located outside of said livestock trailer and for slidable removal from said supporting bracket means,
    (c) a first portion of a latching means that is attached to said grate housing means and is accessible from the exterior of said livestock trailer, and
    (d) a second portion of a latching means that is attached to said grate assembly means and is adapted for cooperating with said first portion of a latching means for maintaining said grate assembly in a position of cooperation with said grate housing means.

11. The improved drainage grate for livestock trailers as defined by claim 10 wherein said first portion of a latching means includes mounting bracket means.

12. The improved drainage grate for livestock trailers as defined by claim 11 wherein said mounting bracket means includes at least one protrusion adapted for cooperating with said second portion of a latching means.

13. The improved drainage grate for livestock trailers as defined by claim 12 including retaining pin means adapted for inserting through a hole provided in said at least one protrusion for maintaining said first portion of a latching means in a position of cooperation with said second portion of a latching means.

14. The improved drainage grate for livestock trailers as defined by claim 10 wherein said grate assembly means includes rod means adapted for inserting into said grate housing means, said rod means providing a bearing surface over a portion of said drainage hole for livestock to stand upon.

15. The improved drainage grate for livestock trailers as defined by claim 14 wherein said rod means includes a plurality of rod means.

* * * * *